(12) United States Patent
Chikaraishi

(10) Patent No.: US 6,239,529 B1
(45) Date of Patent: May 29, 2001

(54) FIXING STRUCTURE FOR COIL ASSEMBLY AND POWER-STEERING DEVICE

(75) Inventor: Kazuo Chikaraishi, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/431,927

(22) Filed: Nov. 2, 1999

(30) Foreign Application Priority Data

Dec. 28, 1998 (JP) .................................................. 10-372765

(51) Int. Cl.$^7$ .............................. H02K 1/00; G01D 18/00
(52) U.S. Cl. ...................................... 310/194; 73/862.331
(58) Field of Search .............................. 310/194, 91, 90, 310/42; 73/862.331; 180/444; 464/30, 42

(56) References Cited

U.S. PATENT DOCUMENTS

| | | | |
|---|---|---|---|
| 4,996,890 | * 3/1991 | Taniguchi et al. | 73/862.33 |
| 5,578,767 | 11/1996 | Chikaraishi et al. | 73/862.331 |
| 5,739,616 | * 4/1998 | Chikaraishi et al. | 310/194 |
| 5,796,014 | 8/1998 | Chikaraishi et al. | 73/862.331 |
| 5,811,903 | * 9/1998 | Ueno et al. | 310/90 |

FOREIGN PATENT DOCUMENTS

| | | |
|---|---|---|
| 4-38540 | 3/1992 | (JP) . |
| 9-101212 | 4/1997 | (JP) . |

* cited by examiner

*Primary Examiner*—Nestor Ramirez
*Assistant Examiner*—Dang Dinh Le
(74) *Attorney, Agent, or Firm*—Evenson, McKeown, Edwards & Lenahan, P.L.L.C.

(57) ABSTRACT

The device of this invention is provided with a disc-shaped spring having an outer peripheral portion placed into contact with an outer race of a bearing and a tapered portion placed into contact with an end portion of a coil yoke, with the configuration being such that the coil yoke is wedged between a concavity 1d of the housing and the upper edge by the elastic force of the disc-shaped spring. It is therefore possible to fix the coil yoke within the housing without having to provide extra components such as a snap ring, which facilitates machining and assembly. In addition, the sealing effect can be increased by placing the disc-shaped spring into contact with the entire periphery of the outer race of the bearing, thus efficiently preventing the intrusion of impurities.

4 Claims, 4 Drawing Sheets

FIXING STRUCTURE FOR COIL ASSEMBLY AND POWER-STEERING DEVICE

BACKGROUND OF THE INVENTION

The present invention relates to an electrical power-steering device and, in particular, to a fixing structure for a coil assembly for torque detection that is used in an electrical power-steering device.

A device known as an electrical power-steering device for a vehicle takes the rotary output of an electric motor, which is to become an auxiliary steering torque, steps it down by means of a gear train, then transfers it to an output shaft of a steering mechanism to steer the vehicle.

One form of such an electrical power-steering device uses a torsion bar that is connected to both an input shaft that is linked to the steering wheel and an output shaft that is linked to the steering mechanism, with the configuration being such that the steering torque is detected thereby. More specifically, since the torsion bar deforms in accordance with the steering torque applied to the steering wheel, the steering torque can be detected accurately by detecting the magnitude of that deformation. If the steering torque can be detected accurately, it becomes possible to output a suitable auxiliary steering torque.

In known examples of this type of detection device, such as those disclosed in U.S. Pat. No. 5,578,767, U.S. Pat. No. 5,739,616, and U.S. Pat. No. 5,796,014, the impedance of a coil provided within the housing is made to vary in accordance with the applied steering torque, and the steering torque is detected on the basis thereof.

Incidentally, in order to accurately measure the amount of distortion of the torsion bar in such a detection device, it is necessary to fix the coil with respect to the housing in such a manner that it does not move in the axial direction of the output shaft. To overcome that problem, the electrical power-steering device disclosed in Japanese Utility Model Laid-Open Application No. Hei 4-38540, for example, is configured such that a disc spring 34 is disposed between a coil yoke 19B and a snap ring (or something similar, although hereinafter "snap ring" is used) 33 that is fitted into an inner radial surface of a housing 25, and the coil yoke 19B is pre-loaded and fixed by the elastic force of the disc spring 34, as shown in FIG. 4.

However, if the configuration is such that this snap ring 33 is disposed between the coil yoke 19B and a bearing 26, the coil yoke 19B and the bearing are inevitably at some distance apart, which has the disadvantage of increasing the length in the axial direction of the device. It is also necessary to provide an installation groove for the snap ring 33 on the inner peripheral surface of the housing 25, but this has disadvantages in that the number of machining steps is increased and the workability during assembly is bad because the snap ring 33 has to be engaged while the disc spring 34 is being compressed.

In addition, since the snap ring 33 must be compressed diametrically while it is being fitted into the installation groove, part of the circumference thereof has to be cut away. Therefore, the cutaway portion cannot maintain a sealing effect, even when the disc spring is placed into contact with the inner surface of the snap ring 33. In other words, since this cutaway allows the intrusion of foreign bodies from the bearing side, there is a danger that, if such foreign bodies should adhere to the circuit board disposed on the outer peripheral side of the coil yoke, they could have adverse effects on the circuit board. Therefore, in such an electrical power-steering device of the prior art, some sort of means should be provided to prevent the intrusion of foreign bodies, which will inevitably increase the cost.

SUMMARY OF THE INVENTION

The present invention was designed in the light of the above described problems with prior-art devices, and has as an object thereof the provision of a fixing structure for a coil assembly and an electrical power-steering device that are effectively capable of preventing the intrusion of foreign bodies or the like thereinto.

In order to achieve the above objective, a fixing structure for a coil assembly in accordance with the present invention relates to:

a fixing structure for fixing a coil assembly with respect to a housing, such that the coil assembly comprises a coil bobbin around which a coil is wound and a circular cylindrical coil yoke accommodating the coil bobbin in the interior thereof, and the coil yoke is fitted into a concavity formed in the housing, wherein:

the fixing structure for a coil assembly is provided with a disc-shaped spring that is placed into contact with an outer race of a bearing on one side and with an edge portion of the coil yoke on another side; and the coil yoke is wedged between edge surfaces of the concavity of the housing by the elastic force of the disc-shaped spring.

Since the fixing structure for a coil assembly in accordance with the present invention is provided with a disc-shaped spring that is placed into contact with an outer race of a bearing on one side and with an edge portion of the coil yoke on another side, and the coil yoke is wedged between edge surfaces of the concavity of the housing by the elastic force of the disc-shaped spring, making it possible to fix the coil yoke within the housing without having to provide extra components such as a snap ring, which facilitates machining and assembly. In addition, the sealing effect can be increased by placing the disc-shaped spring into contact with the entire periphery of the outer race of the bearing, thus efficiently preventing the intrusion of impurities.

If the disc-shaped spring is further provided with a lip portion that is placed into contact with at least one of the bearing and the coil yoke, this would make it possible to further increase the sealing effect.

DETAILED DESCRIPTION OF THE INVENTION

Embodiments of the present invention will be described below with reference to the accompanying drawings.

Figure 1:
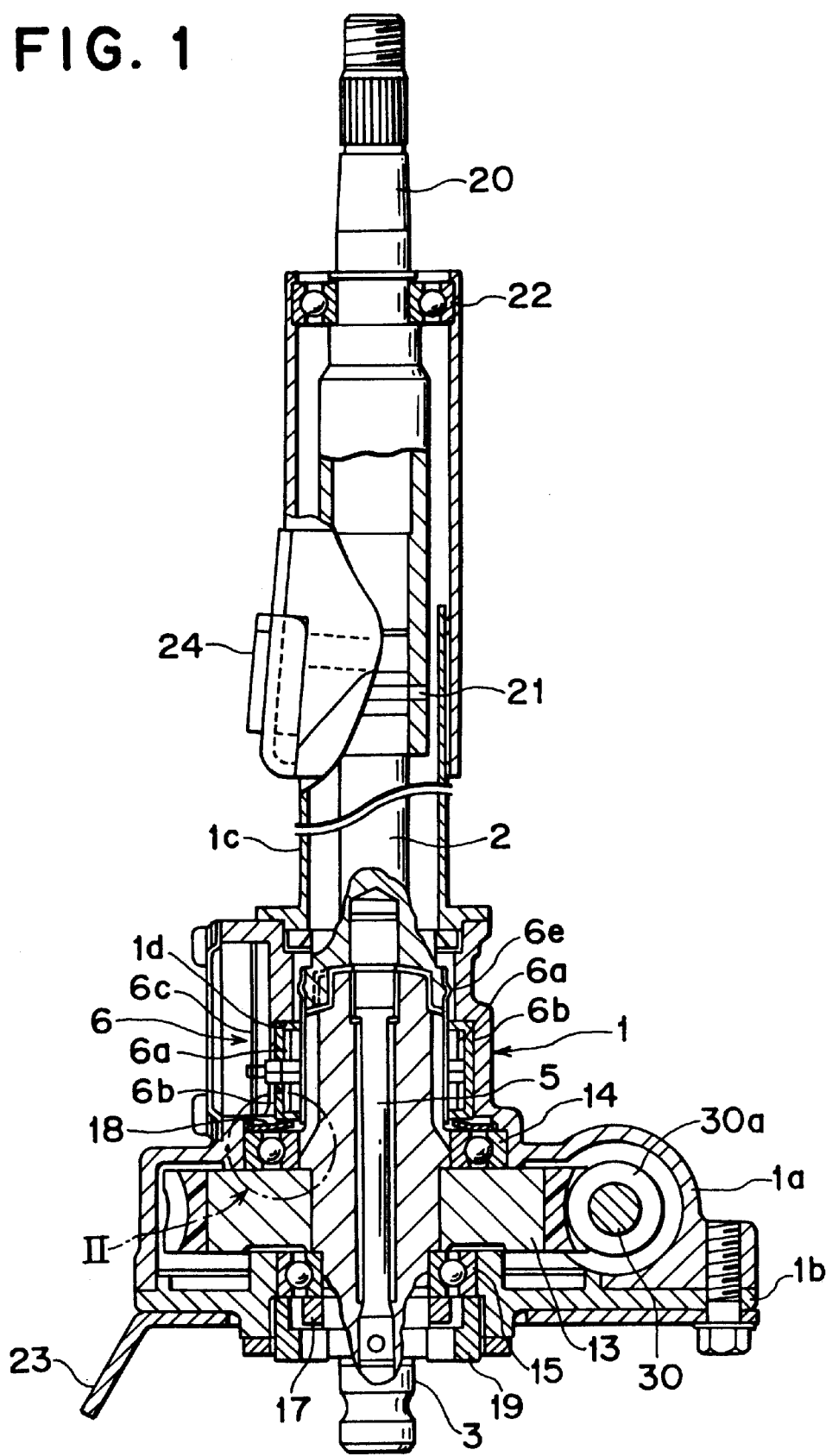
FIG. 1 is an axial cross-sectional view of an electrical power-steering device in accordance with a first embodiment of this invention, together with a steering shaft.

An axial cross-sectional view of an electrical power-steering device in accordance with a first embodiment of this invention is shown in FIG. 1, together with a steering shaft.

In FIG. 1, an output shaft 3 extends vertically within a housing 1 having a downwardly disposed main body 1a and a lid member 1b. An upper end of the housing 1 is linked to a column tube 1c that is assembled from a pair of long, narrow tube members in a telescoping manner, and a steering shaft 20 extends within the column tube 1c. The arrangement is such that a steering wheel (not shown) is affixed to an upper end of the steering shaft 20, and an input shaft 2 is linked to a lower end thereof, with a collapsible mechanism 21 therebetween. Since the concept of the collapsible mechanism 21 is well-known, further details are omitted. The configuration is such that either the housing 1 is affixed by a bracket 23 to an automobile body (not shown), or the column tube 1c is affixed thereto by a bracket 24.

The steering shaft 20 is supported in a freely rotatable manner with respect to the column tube 1c by a bearing 22 and the output shaft 3 is supported in a freely rotatable manner with respect to the housing 1 by bearings 14 and 15. A torsion bar 5, which is linked at an upper end to the input shaft 2 and at a lower end to the output shaft 3, extends within the input shaft 2.

Around the periphery of the upper end of the output shaft 3 is provided a device for detecting steering torque on the basis of the twisting of the torsion bar 5, which is a member that deforms elastically in proportion to applied torque, in other words, a torque sensor 6. This torque sensor 6 is a rotary non-contact type of torque sensor configured of two coil bobbins 6a having coils wound therearound, two circular cylindrical coil yokes 6b accommodating the coil bobbins 6a therein, a circuit board 6c that detects currents generated within the coils, and a sleeve 6e attached to the output shaft 3.

A circular cylindrical concavity 1d is formed in an inner peripheral surface of the housing 1 and the coil yokes 6b are fitted into this concavity 1d. The torque sensor 6 detects the relative angular displacement between the input shaft 2 and the output shaft 3, based on the twisting of the torsion bar 5, by the coils as a change in the impedance in a predetermined electromagnetic circuit, and outputs an electrical signal to a control circuit that is not shown in the drawing (see Japanese Laid-Open Patent Application No. Hei 9-101212 and U.S. Pat. No. 5,739,616, for example).

A worm wheel 13 is affixed by means such as press-fitting to the outer periphery of a central portion of the output shaft 3. The worm wheel 13 engages with a worm 30a that is linked to a rotary shaft 30 of an electric motor (not shown). This electric motor is linked to a control circuit (not shown), but this control circuit is designed to input information such as the output of the torque sensor 6 and the speed of the vehicle then supply a predetermined amount of electrical power to the electric motor to generate a suitable auxiliary torque.

The upper bearing 14 engages with an upper side of the worm wheel 13, which is attached to the output shaft 3, and the lower bearing 15 engages with a lower side of the worm wheel 13. An inner race of the lower bearing 15 is designed in such a manner that it is attached to the output shaft 3 by the tightening of a nut 17 with respect to the output shaft 3. Similarly, and outer race of the lower bearing 15 is designed in such a manner that it is fixed with respect to the housing 1 by the tightening of a locking member 19 with respect to the housing 1. The locking member 19 also has the function of applying a pre-load to the bearings 14 and 15. The lower end of the output shaft 3 is connected to a steering device such as a rack-and-pinion mechanism (not shown).

Figure 2:
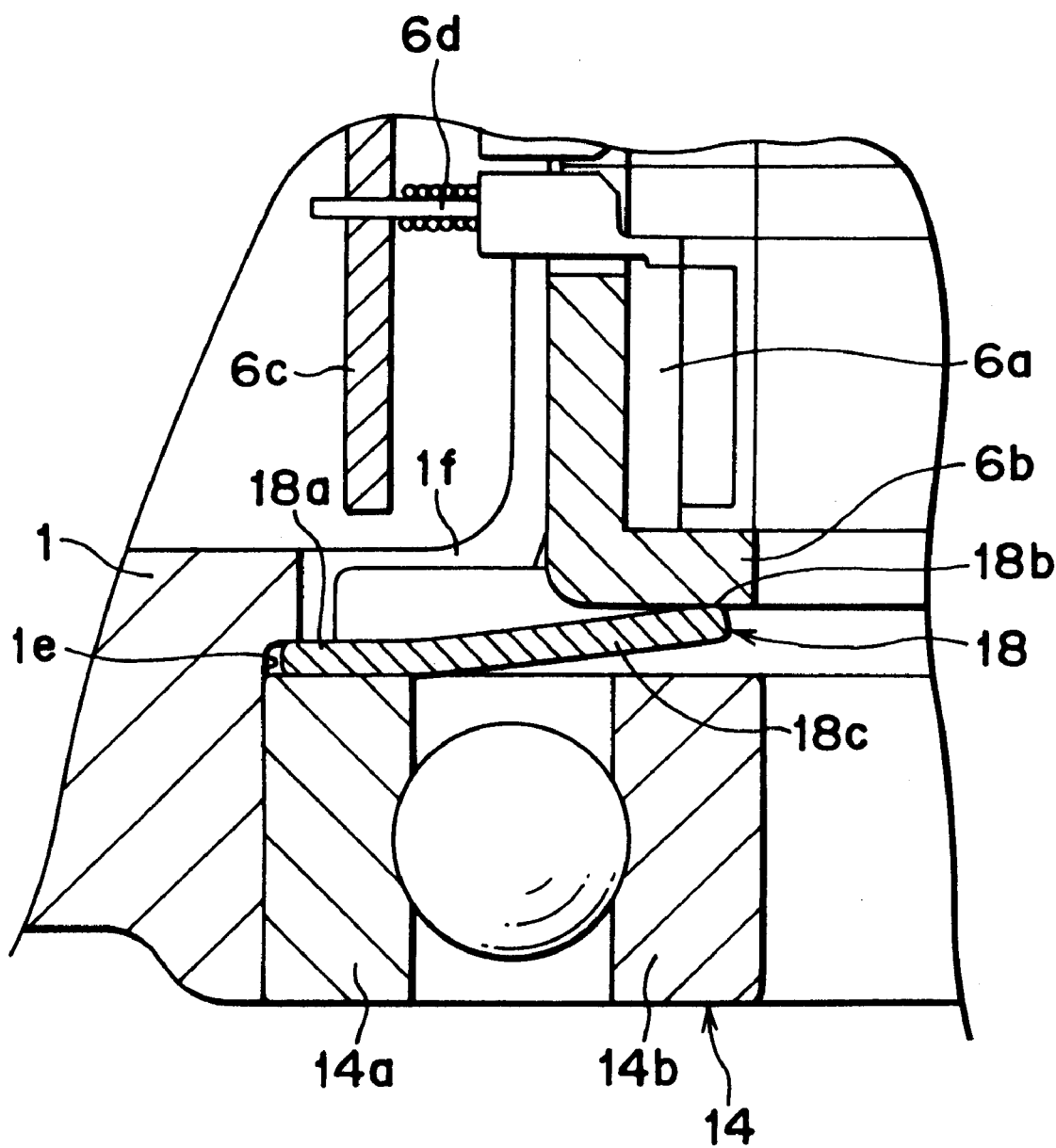
FIG. 2 is an enlarged view of the portion of the electrical power-steering device indicated by the arrow II in FIG. 1.

An enlargement of the region of the structure indicated by the arrow II in FIG. 1 is shown in FIG. 2. In FIG. 2, a step portion 1e is formed in the inner peripheral surface of the housing 1 into which the bearing 14 fits. Cutouts if are formed in the housing 1 in the vicinity of the step portion 1e in such a manner that a lead 6d protruding radially from each of the coil yokes 6b passes therethrough during the installation of the coil yokes 6b.

A disc spring 18 comprises a flange portion 18a on an outer peripheral side extending in the radial direction and a tapered portion 18c on an inner peripheral side and inclined upward. The disc spring 18 is installed in such a manner that the flange portion 18a is sandwiched between and fixed by an upper surface of an outer race 14a of the bearing 14 (14b denotes an inner race thereof) and the step portion 1e of the housing 1. An upper edge 18b of the tapered portion 18c of the disc spring 18 is placed into contact with lower edge surfaces of the coil yokes 6b by the elasticity thereof.

The description now turns to the operation of this embodiment of the electrical power-steering device in accordance with the present invention, with reference to FIG. 1.

If the vehicle is in a state in which it is proceeding straight ahead, and no steering force is input to the input shaft 2 via the steering wheel (not shown) and the steering shaft 20 shown in FIG. 1, the torque sensor 6 does not generate an output signal and therefore the electric motor does not generate an auxiliary steering force.

If the driver turns the steering wheel (not shown) when the vehicle is to follow a curve, the torsion bar 5 twists in accordance with that steering force so that a relative rotation is generated between the input shaft 2 and the output shaft 3. The torque sensor 6 outputs a signal in accordance with the direction and magnitude of this relative rotation. The electric motor operates to output an auxiliary steering force, based on that signal. The rotation of the electric motor is stepped down by the worm gear train then is transferred to the output shaft 3 to aid the operation of the steering mechanism (not shown).

The description now concerns the assembly of the torque detection device of this embodiment of the invention. First of all, the coil yokes 6b are inserted into the concavity 1d of the housing 1 of FIG. 1, then the bearing 14 is inserted into the housing 1 together with the disc spring 18. In this case, the flange portion 18a of the disc spring 18 is guided onto the installation surface of the bearing 14, as shown in FIG. 2, so that it is sandwiched between the step portion 1e of the housing 1 and the upper surface of the outer race 14a of the bearing 14 and is accommodated at a suitable position, with no displacement in the radial direction. The configuration is therefore such that installation can be performed easily, with no danger of the disc spring 18 becoming mangled or otherwise damaged.

Since the installation position of the bearing 14 that energizes the disc spring 18 is governed by the step portion 1e, management of the amount of crushing of the disc spring 18 is facilitated, making it possible to provide a structure in which there is little variation in pre-loading. The employment of this embodiment of the invention makes it unnecessary to provide a snap ring or the like for the installation of the disc spring 18, so the snap-ring installation groove can be omitted, which simplifies the process of machining the housing and thus reduces the structural costs. To ensure that the inner race of the bearing does not interfere with the base of a hole when it is being fitted into that hole, it is generally common to provide a relief hole of a diameter larger than that of the inner race in the base of the hole, so that, if such a relief hole is provided beforehand, the disc spring 18 can be disposed within the housing 1 without having to subject the housing 1 to any special machining.

To energize the coil yokes 6b towards the concavity id side (see FIG. 1), the tapered portion 18c of the disc spring 18 is configured in such a manner that the coil yokes 6b can be installed in a pre-loaded state, as shown in FIG. 2. In addition, since the disc spring 18 forms a bridge radially around the entire circumference between the step portion 1e of the housing 1 and the coil yokes 6b, a hermetic seal can be formed between the bearing 14 and the coil yokes 6b. Thus, even if lubricating oil or impurity fragments are generated on the output shaft 3 or bearing 14 side, there is a lower danger of them intruding into the circuit board 6c side because such lubricating oil or foreign bodies such as impurities are halted by the disc spring 18. It is therefore possible to provide a highly reliable electrical power-steering device at a low cost.

Figure 3:
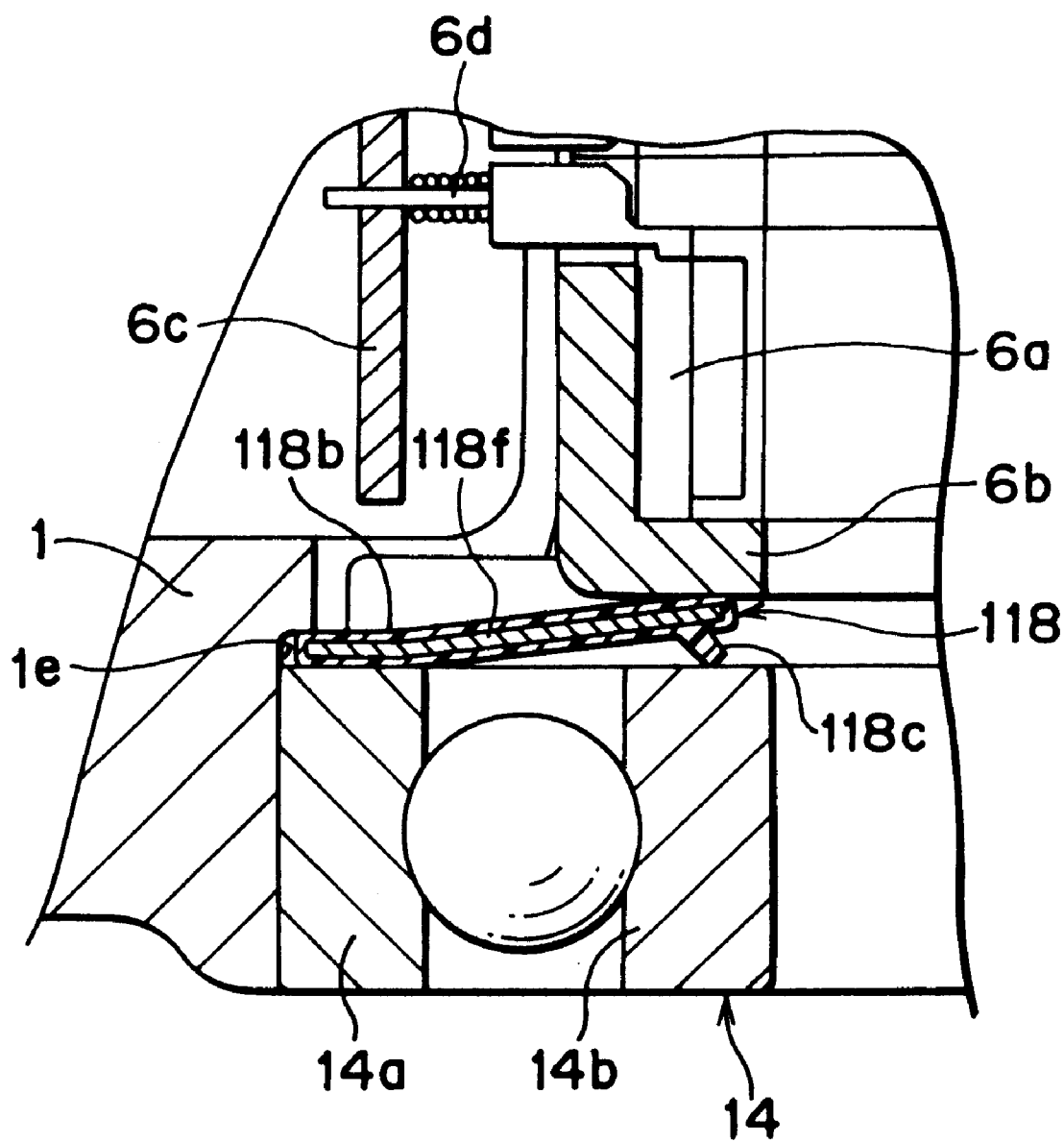
FIG. 3 is a view similar to that of FIG. 2, but of a second embodiment of this invention.
Figure 4:
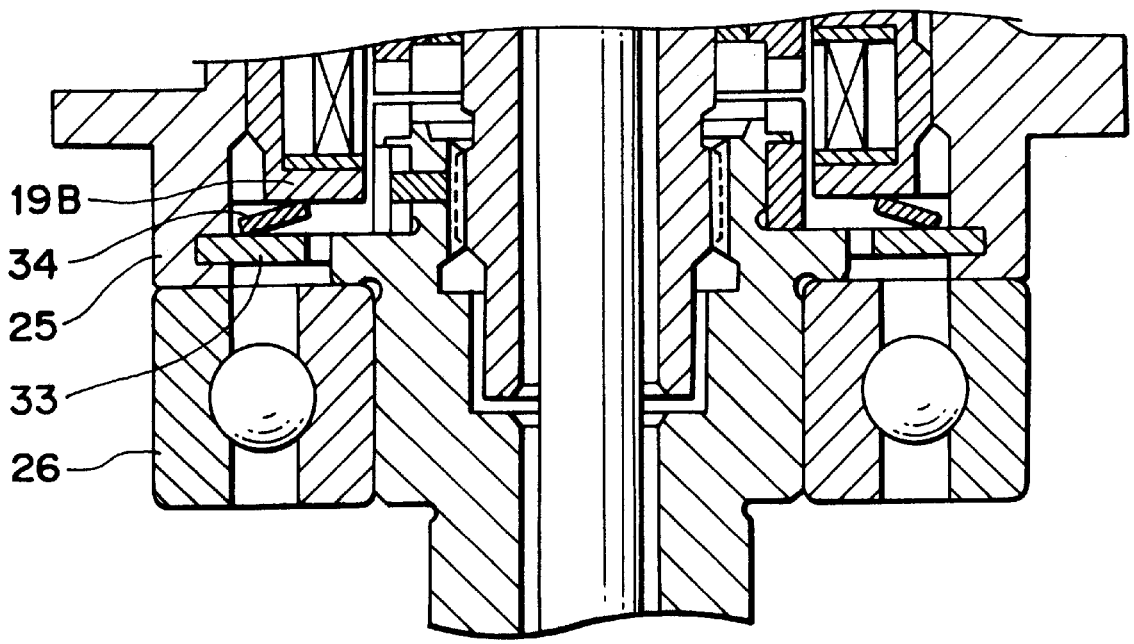
FIG. 4 is a partial enlarged view of a disc spring installation portion in a prior-art electrical power-steering device.

A second embodiment of this invention is shown in FIG. 3 in a similar manner to FIG. 2. The embodiment shown in FIG. 3 differs from the embodiment of FIG. 2 in the configuration of the disc spring. Since the rest of the configuration is common to that of the first embodiment, duplicated description thereof is omitted.

In FIG. 3, a disc spring 118 is configured of a metal core 118a having a shape similar to that of the disc spring 18 (see FIG. 2) and a covering portion 118b of resin that is formed to cover the entire surface of the metal core 118a. A lip portion 118c is formed to protrude in a conical form on an inner side of the covering portion 118b. A leading edge of the lip portion 118c is placed in contact with the inner race 14b of the bearing 14 by the elasticity thereof (note that 14a denotes the outer race).

With this embodiment of the invention, the comparatively flexible covering portion 118b of the disc spring 118 is placed into contact with the step portion 1e and the coil yokes 6b by the elasticity thereof, making it possible to achieve an even higher sealing effect than that of the first embodiment. In addition, since the configuration is such that the resin lip portion 118c is placed into contact with the upper surface of the inner race 14b of the bearing 14 by the elasticity thereof, the upper surface of the bearing 14 is shielded hermetically by the disc spring 118 and this makes it possible to prevent the intrusion of lubricating oil or impurities in a more efficient manner.

Note that, although the present invention has been described above by means of specific embodiments thereof, it should be obvious to those skilled in the art that this invention is not limited thereto and thus it can be modified and improved upon within the scope of the claims herein. For example, various other configurations could be considered for the structure on the output shaft side, irrespective of the above described embodiments. In addition, the lip portion in contact with the coil yokes can be shaped to provide a greater sealing effect.

Since the fixing structure for a coil assembly in accordance with this invention is provided with a disc-shaped spring that is placed into contact with an outer race of a bearing on one side and with an edge portion of the coil yoke on another side; and the coil yoke is wedged between edge surfaces of the concavity of the housing by the elastic force of the disc-shaped spring, it is possible to fix the coil yoke without having to provide extra components such as a snap ring, which facilitates machining and assembly. In addition, the sealing effect can be increased by ensuring that the disc-shaped spring is placed into contact with the entire periphery of the outer race of the bearing, making it possible to efficiently prevent the intrusion of foreign bodies.

What is claimed is:

1. A fixing structure for fixing a coil assembly with respect to a housing of an electrical power steering device, such that said coil assembly comprises a coil bobbin around which a coil is would and a circular cylindrical coil yoke accommodating said coil bobbin in the interior thereof, and said coil yoke is fitted into a concavity formed in said housing, wherein:

said fixing structure for a coil assembly is provided with a disc-shaped spring that is placed into contact with substantially an entire side surface of an outer race of a bearing on one side and with a side surface of an edge portion of said coil yoke on another side; and said coil yoke is wedged between edges surfaces of said concavity of said housing by the elastic force of said disc-shaped spring.

2. The fixing structure for a coil assembly according to claim 1, wherein said disc-shaped spring covered by resin is provided with a leading edge of lip portion that is placed into contact with a side surface of an inner race of said bearing on one side of said spring and said spring is in contact with a side surface of said coil yoke on another side of said spring.

3. The fixing structure for a coil assembly according to claim 1, wherein an edge portion on one side of said disc-shaped spring is sandwiched between a step portion formed in said housing and said outer race of said bearing.

4. An electric power-steering device comprising:

a torque detection device comprising a fixing structure for a coil assembly with respect to a housing, such that said coil assembly comprising a coil bobbin around which a coil is wound and a circular cylindrical coil yoke accommodating said coil bobbin in the interior thereof, and said coil yoke is fitted into a concavity formed in said housing, wherein said fixing structure for a coil assembly is provided with a disc-shaped spring that is placed into contact with substantially an entire side surface as an outer race of a bearing on one side and with a side surface of an edge portion of said coil yoke on another side and wherein said coil yoke is wedged between edge surfaces of said concavity of said housing by the elastic force of said disc-shaped spring; and a motor for outputting an auxiliary steering force in accordance with a torque detected by said torque detection device.

* * * * *